US010613630B2

(12) United States Patent
Omote

(10) Patent No.: US 10,613,630 B2
(45) Date of Patent: Apr. 7, 2020

(54) TEMPERATURE CONTROLLED HEADSET APPARATUS

(71) Applicant: Sony Interactive Entertainment Inc., Tokyo (JP)

(72) Inventor: Masanori Omote, Half Moon Bay, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 9 days.

(21) Appl. No.: 15/281,809

(22) Filed: Sep. 30, 2016

(65) Prior Publication Data

US 2018/0095534 A1    Apr. 5, 2018

(51) Int. Cl.
| | | |
|---|---|---|
| *G06F 3/01* | (2006.01) | |
| *A63F 13/28* | (2014.01) | |
| *G02B 27/01* | (2006.01) | |
| *G02B 27/02* | (2006.01) | |
| *H05B 3/00* | (2006.01) | |

(52) U.S. Cl.
CPC .............. *G06F 3/016* (2013.01); *A63F 13/28* (2014.09); *G02B 27/017* (2013.01); *G02B 27/022* (2013.01); *G02B 27/028* (2013.01); *G06F 3/011* (2013.01); *G06F 3/012* (2013.01); *H05B 3/00* (2013.01)

(58) Field of Classification Search
None
See application file for complete search history.

(56) References Cited

U.S. PATENT DOCUMENTS

| 2009/0120105 A1 | 5/2009 | Ramsay et al. |
| 2012/0182206 A1* | 7/2012 | Cok ................... G02B 27/017 345/8 |

(Continued)

FOREIGN PATENT DOCUMENTS

| JP | 2001100144 A | 4/2001 |
| TW | 201511803 A | 4/2015 |
| WO | WO2014152630 A1 | 9/2014 |

OTHER PUBLICATIONS

Roshan Lalintha Peiris et al., "ThermoVR", Exploring Integrated Thermal Haptic Feedback with Head Mounted Displays, CHI 2017, May 6-11, 2017, Denver, CO, USA, 5-pages.

(Continued)

*Primary Examiner* — Stephen T. Reed
(74) *Attorney, Agent, or Firm* — Penilla IP, APC

(57) ABSTRACT

A head mounted display (HMD) including a lens of optics configured for viewing virtual reality (VR) content. The HMD includes a display screen disposed behind the lens of optics such that the lens of optics is between the display screen and an eye of a user when the HMD is worn by the user, wherein the display screen is configured for rendering the VR content. The HMD includes a support structure configured to fit around a head of the user when worn, wherein the lens of optics and display screen is disposed within the support structure such that the display screen is located in front of the eye when the HMD is worn. The HMD includes a heating component disposed in the support structure, wherein the heating component is controllable to provide heat in response to an environmental cue in the VR content displayed on the display screen.

29 Claims, 14 Drawing Sheets

(56) References Cited

U.S. PATENT DOCUMENTS

| | | | |
|---|---|---|---|
| 2014/0361956 A1* | 12/2014 | Mikhailov | H04N 13/0271 |
| | | | 345/8 |
| 2015/0293428 A1 | 10/2015 | Ben-Abdallah et al. | |
| 2016/0129346 A1 | 5/2016 | Mikhailov et al. | |
| 2016/0139666 A1* | 5/2016 | Rubin | B25J 11/003 |
| | | | 345/633 |
| 2016/0270656 A1* | 9/2016 | Samec | A61B 3/085 |
| 2018/0050267 A1* | 2/2018 | Jones | A63F 13/285 |

OTHER PUBLICATIONS

International Search Report & Written Opinion, PCT/US2017046825, dated Nov. 14, 2017, 18-pages.
Taiwan International Patent Office_Office Action with Search Report_dated Sep. 12, 2018_14 pages.

\* cited by examiner

TEMPERATURE CONTROLLED HEADSET APPARATUS

TECHNICAL FIELD

The present disclosure is related to improving user experience when interacting with virtual reality (VR) content, and the presentation of a heat image to a user in response to an environmental cue in the VR content.

BACKGROUND OF THE DISCLOSURE

Computer generated virtual reality (VR) allows a user to be immersed in a simulated real environment or an imaginary environment, for example. With complete immersion, the user is able to interact with the simulated or imaginary environment, as if the user were present within that VR environment. That is, the user is able to move and look around the VR environment, and possibly interact with objects within that VR environment.

Total immersion gives the user the perception of being physically present in the VR environment. The senses of the user should be stimulated while the user is interacting with and present in the VR environment to give the user a fully immersive experience within the VR environment. For example, visual stimulation may be provided through panoramic three-dimensional (3D) displays; audio stimulation may be provided through surround sound acoustics; tactile stimulation may be provided through haptic and/or force feedback; olfactory stimulation may be provided through smell replication; and taste stimulation may be provided through taste replication.

Improvement is still needed when providing stimulation to give the user an immersive experience in a VR environment.

It is in this context that embodiments of the disclosure arise.

SUMMARY

Embodiments of the present disclosure relate to systems and methods for providing a heat image via a head mounted display (HMD) in response to an environmental cue presented in virtual reality (VR) content. Several inventive embodiments of the present disclosure are described below.

In one embodiment, an HMD is disclosed. The HMD includes a lens of optics configured for viewing virtual reality (VR) content. The HMD includes a display screen disposed behind the lens of optics, such that the lens of optics is between the display screen and an eye of a user when the HMD is worn by the user. The display screen is configured for rendering the VR content. The HMD includes a support structure configured to fit around a head of the user when worn. The lens of optics and the display screen are disposed within the support structure such that the display screen is located in front of the eye when the HMD is worn. The HMD includes a heating component disposed in the support structure, wherein the heating component is controllable to provide heat in response to an environmental cue in the VR content displayed on the display screen.

In another embodiment, another HMD is disclosed. The HMD includes a lens of optics configured for viewing VR content. The HMD includes a display screen disposed behind the lens of optics, such that the lens of optics is between the display screen and an eye of a user when the HMD is worn by the user. The display screen is configured for rendering the VR content. The HMD includes a support structure configured to fit around a head of the user when worn, wherein the lens of optics and display screen is disposed within the support structure such that the display screen is located in front of the eye when the HMD is worn. The display screen includes an array of heating components disposed in the support structure, wherein each of the array of heating components is individually controllable to provide a heat image in response to an environmental cue in the VR content displayed on the display screen.

Further, another embodiment discloses a method for providing VR stimulation. The method includes rendering VR content on a display screen, wherein the display screen is disposed within a support structure of a head mounted display (HMD) configured to fit around of a head of a user when worn. When the HMD is worn by the user, the display screen is located in front of an eye of the user. The method includes determining a heat image of an environmental cue in the VR content with respect to an interaction of the user within a VR environment shown by the VR content. The method includes individually controlling each of an array of heating components to provide the heat image in response to the environmental cue in the VR content displayed on the display screen, wherein the array of heating components is disposed in the support structure. Each of the heating components is configured to provide heat.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a head mounted display (HMD) that equips a heat source located inside the HMD unit. In that manner, the user is given a heat sensation that is associated with VR content. For example, in the virtual world or environment created by the VR content, the user could receive heat from a fireball created by the firing of a rocket propelled grenade (RPG), or feel the heat from the sun when transitioning virtually from an inside environment to an outside environment. The heat enabled HMD makes it possible for a user to feel heat that is responsive to an environmental cue in the VR content displayed by the HMD.

With the above general understanding of the various embodiments, example details of the embodiments will now be described with reference to the various drawings. For purposes of clarity and brevity, embodiments of the present invention are described in relation to the generation of heat in an HMD in response to an environmental cue in VR content generated from a video game; however, it is understood that VR content may be generated from any type of application or source capable of generating such content.

Figure 1A:
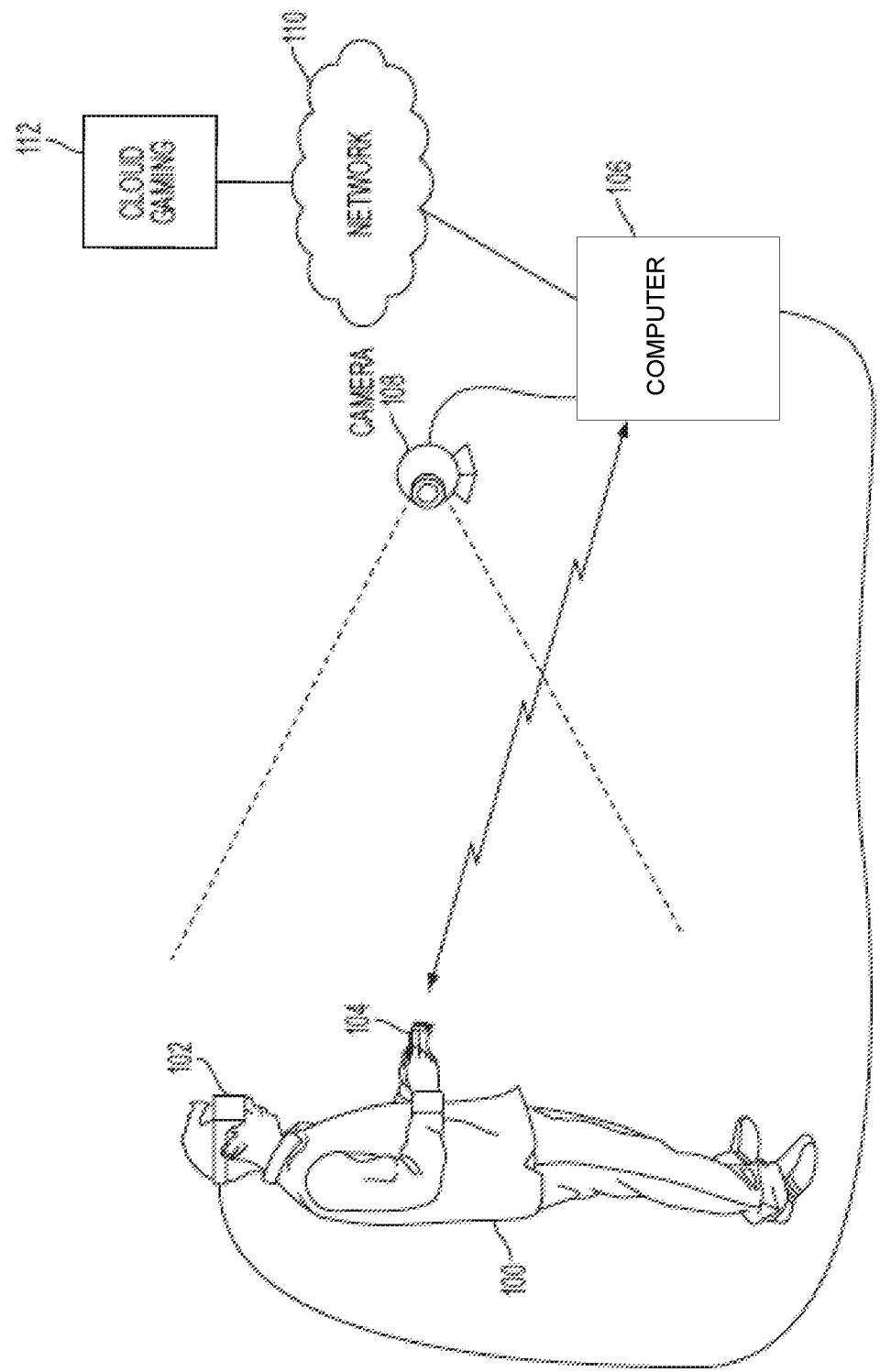
FIG. 1A illustrates a system configured for providing an interactive experience with VR content, in accordance with one embodiment of the present disclosure.

FIG. 1A illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, HMD 102 is configurable to provide heat that is responsive to environmental cues in VR content displayed by the HMD 102 and generated by an application executed by computer 106, or that is executed at a back end server (e.g., cloud gaming 112) over a network. In that manner, the user is given the physical sensation of heat generated by a virtualized environmental cue (e.g., sun, fire, breath, passing hot object, etc.) in the VR content. In one embodiment, HMD 102 includes a heat controller (not shown) that is configured to control a heating assembly in the HMD 102, such that heat is provided by the heating assembly in response to the environmental cue in VR content displayed by the HMD 102.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. The computer 106 is not restricted to executing a video game but may also be configured to execute an interactive application, which outputs VR content for rendering by the HMD 102. In one embodiment, computer 106 performs the functions of the heat controller to control the heating assembly in the HMD 102.

The user 100 may operate a controller 104 to provide input for the video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the video game, while the remaining portion of the video game may be executed on a cloud gaming provider 112. For example, a request for downloading the video game from the computer 106 may be serviced by the cloud gaming provider 112. While the request is being serviced, the cloud gaming provider 112 may execute a portion of the video game and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the video game is downloading on to the computer 106. The cloud gaming provider 112 processes the inputs to affect the game state of the executing video game. The output from the executing video game, such as video data, audio data, and haptic feedback data, is transmitted to the computer 106 for onward transmission to the respective devices.

Once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108. In such embodiments, a game state of the video game at the computer 106 is synchronized with the game state at the cloud gaming provider 112. The synchronization may be done periodically to keep the state of the video game current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 1B:
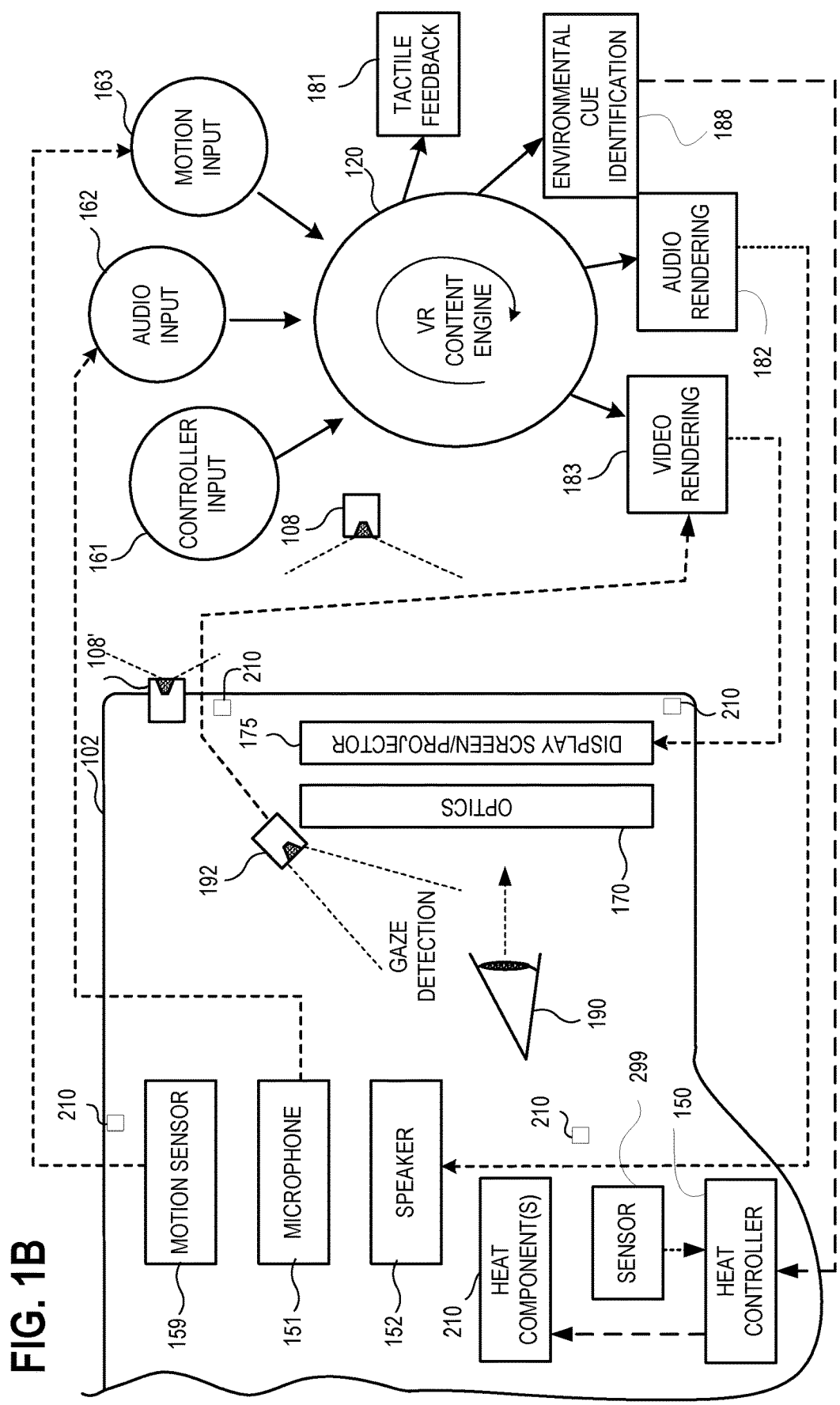
FIG. 1B conceptually illustrates the function of a HMD in conjunction with an executing video game, in accordance with an embodiment of the invention.

FIG. 1B conceptually illustrates the function of a HMD 102 in conjunction with the generation of VR content (e.g., execution of an application and/or video game, etc.), in accordance with an embodiment of the invention. In some implementations, the VR content engine 120 is being executed on a computer 106 (not shown) that is communicatively coupled to the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 120 executing an application may be a video game engine executing a video game, and is configured to receive inputs to update a game state of the video game. The following description of FIG. 1B is described within the context of the VR content engine 120 executing a video game, for purposes of brevity and clarity, and is intended to represent the execution of any application capable of generating VR content. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine 120 receives, by way of example, controller input 161, audio input 162 and motion input 163. The controller input 161 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. The VR content engine 120 (e.g., executing a gaming application) receives inputs which are processed according to the configuration of the game engine to update the game state of the video game. The engine 120 outputs game state data to various rendering modules which process the game state data to define content which will be presented to the user.

In the illustrated embodiment, a video rendering module 183 is defined to render a video stream for presentation on the HMD 102. A lens of optics 170 in the HMD 102 is configured for viewing the VR content. A display screen 175 is disposed behind the lens of optics 170, such that the lens of optics 170 is between the display screen 175 and an eye of the user, when the HMD 102 is worn by the user. In that manner, the video stream may be presented by the display screen/projector mechanism 175, and viewed through optics 170 by the eye 190 of the user. An HMD user may elect to interact with the interactive VR content (e.g., VR video source, video game content, etc.) by wearing the HMD and selecting a video game for game play, for example. Interactive virtual reality (VR) scenes from the video game are rendered on the display screen 175 of the HMD. In that manner, the HMD allows the user to completely immerse in the game play by provisioning display mechanism of the HMD in close proximity to the user's eyes. The display regions defined in the display screen of the HMD for rendering content may occupy large portions or even the entirety of the field of view of the user. In one embodiment, the lens of optics 170 and display screen are disposed within a support structure 220 of the HMD 120 that is configured to fit around the head of the user, such as user 102, when the support structure is worn. Further, the lens of optics 170 and display screen 175 are disposed within the support structure 220, such that the display screen 175 is located in front of one or both eyes of the user when the HMD 120 is worn. Typically, each eye is supported by an associated lens of optics 170 which is viewing one or more display screens.

An audio rendering module 182 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 192 is included in the HMD 102 to enable tracking of the gaze of the user. Although only one gaze tracking camera 192 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 192, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 181 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

In one embodiment, heat controller 150 is configured within the HMD 102 to control one or more heating components 210 in the HMD 102, such that heat is provided by the heating components in response to an environmental cue in VR content displayed by the HMD 102. An environmental cue identification module 188 is configured to identify the environmental cue. In another embodiment, processor 700 may provide functionality of a heat controller 150'. In still another embodiment, the heat controller is located within the computer 106. The heating components 210 may be disposed in the support structure 220. In particular, each heating component 210 is controllable to provide heat in response to an environmental cue in the VR content that is displayed on the display screen 175. At any particular point in time when rendering of VR content on the display screen 175, a heat image or heat signature may be defined by the activation and non-activation of the heating components 210.

Figure 2A:
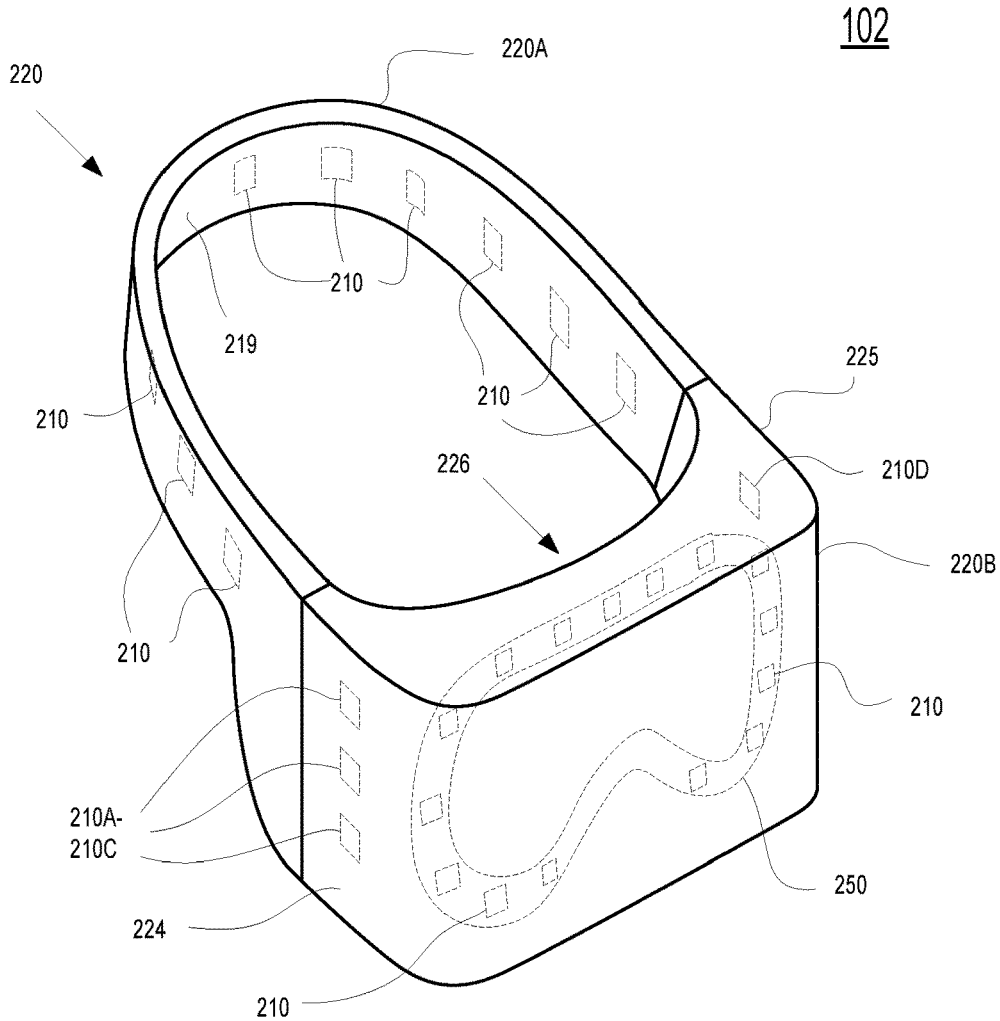
FIG. 2A illustrates a head mounted display (HMD) configured for providing a heat image in response to an environmental cue in VR content displayed in the HMD, in accordance with one embodiment of the present disclosure.

FIG. 2A illustrates a head-mounted display (HMD) 102, in accordance with an embodiment of the invention. As shown, the HMD 102 includes a support structure 220 that is configured to fit around a head of a user (not shown) when worn. The support structure 220 includes a head attachment 220A that is configured for support on the head when the HMD 102 is worn. For example, the head attachment 220A may be a head strap. Further, the support structure 220 includes a display housing 220B configured to include the lens of optics and the display screen, such as the lens 170 and display screen 175 shown in FIG. 1B. The display housing 220B is attached to the head attachment 220A, and may be configured to rest proximate a face of the user and position the display screen in front of the face of the user when the HMD is worn. In embodiments, the display housing includes a facial interface 250 that is proximate to and lies closest to the face of the user. In particular, the lens of optics and display screen are disposed within the support structure 220, and more specifically within the display housing 220B, such that the display screen is located in front of the eye when the HMD is worn.

As shown in FIG. 2A, the support structure 220 includes a one or more heating components 210. Heating components 210 may be disposed in the head attachment 220A and/or in the display housing 220B. Each of the heating components 210 in the support structure 220 may be individually controllable to provide heat when activated, or not to provide heat when inactive. In that manner, a heat image produced throughout the HMD 102 may be generated within the support structure 220 that is in response to an environmental cue. Specifically, the heating components 210 disposed in the support structure 220 that in combination (activated or not activated) provide the heat signature. In that manner, heat may be provided throughout the whole head, to the back of the head, to either or both sides of the head, to the top or bottom of the face, front of face, to a portion of the face, or to a portion of the head. In that manner, heat may be applied to the face and/or head in various combinations of the following (e.g., right side, left side, top, bottom, front, forehead, etc.).

Furthermore, over a period of time, one or more heat images providing heat may be generated by one or more heating components 210 in the support structure 220 in response to one or more environmental cues in VR content displayed in the HMD. Also, the one or more heat images may be presented in response to the one or more environmental cues and with respect to the interaction of the user with the VR content. For example, one or more heat images may be generated for a hot object that can be felt by a user, and that travels across the view of the user, such that a hot spot may travel from one side of the face to the other side of the face as presented by multiple heat images over a period of time. In addition, one or more heat images may be generated for a hot object that remains static within the VR world or environment, but the user may move, or the head of the user may move in relation to the hot object.

Figure 2D:
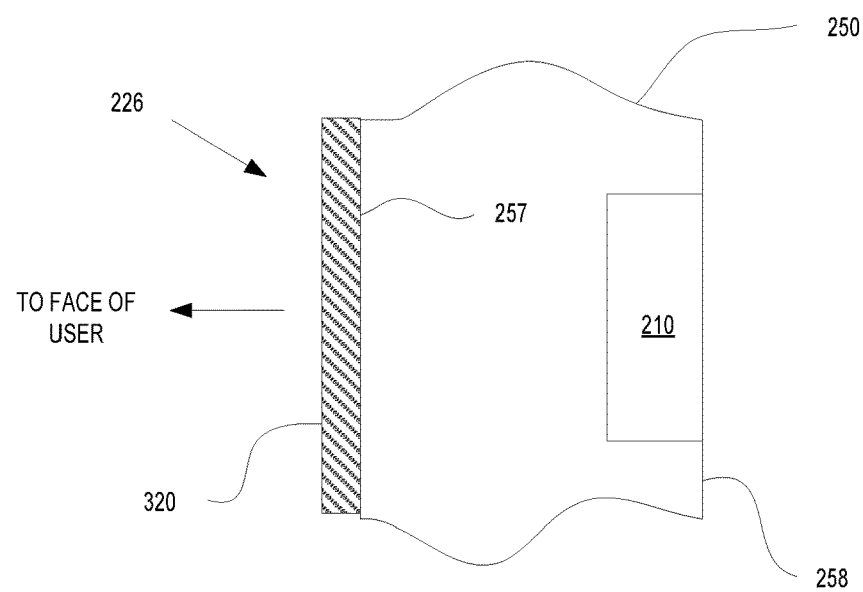
FIG. 2D is a cross-section of a facial interface of a display housing of an HMD, in accordance with one embodiment of the present disclosure.

As shown, one or more heating components 210 are disposed within the display housing 220B. In particular, one or more heating components 210 may be disposed within a facial interface 250 of the display housing 220B. The facial interface 250 is disposed within an inner surface 226 of the display housing 220B. The facial interface 250 of the display housing is configured proximate to the face of the user, in part to block out outside light. In one embodiment, the distance between the facial interface 250 and the face of the user may range between 0-30 mm, wherein the distance may not be uniform across the entire interface. In another embodiment, the distance between the facial interface 250 and the face of the user may range between 1-20 mm, wherein the distance may not be uniform across the entire interface. In still another embodiment, the distance between the facial interface 250 and the face of the user may range between 2-10 mm, wherein the distance may not be uniform across the entire interface. Specifically, the heating components 210 disposed in the facial interface 250 are configured to provide heat to the face of the user. FIGS. 2B-2E describe more fully the implementation of one or more heating components 210 within the inner mask and/or facial interface 250. FIG. 2D is a cross-section of the facial interface 250 of the display housing 220B of an HMD 102, in accordance with one embodiment of the present disclosure. Facial interface 250 includes a front side 257 that is exposed to the face of the user. The front side 257 may form the inner surface 226 of the display housing 220B that is exposed to the user. A heating component 210 is disposed in the facial interface 250, and is located adjacent to a back side 258 of the facial interface 250, wherein the back side 258 is opposite the front side 257. A protective liner 320 may be configured adjacent to the front face 257 of the facial interface 250. In that manner, the liner is interposed between the face of the user and the facial interface 250, which includes the heating component 210 in order to diffuse the heat generated by the heating components 210, thereby protecting the user from direct or over exposure to heat. In this case, the inner surface 226 of the display housing 220B that is exposed to the user may be a surface of the liner 320.

Further, one or more heating components 210 may be located within the sidewalls of display housing 220B to provide heat to the sides of the face. For example, heating components 210C-210C may be located on a right sidewall 224 of the display housing 220B, and may be activated to provide heat to the right side of a face of a user, when the HMD 102 is worn by the user. Similarly, one or more heating components 210 may be located (e.g., including heating component 210D) may be located on a left sidewall 225 of the display housing 22B, and may be activated to provide heat to the left side of the face of the user, when the HMD 102 is worn.

In addition, the head attachment 220A of the support structure 220 may include one or more heating components 210. For example, heating components 210 are configured along the inner surface of the head attachment 220A, and are configured to provide heat to the portions of the head of the user. Depending on which heating components 210 are activated, heat may be provided to one side of the head, both sides of the head, and to the back of the head in various combinations. Furthermore, each of the heating components 210 in the head attachment 220A may be individually controllable to provide heat to an environmental cue in combination with the one or more heating components that are individually controllable to provide heat in the display housing 220B.

In one embodiment, the one or more heating components 210 may regulate heat about the head of a user. In particular, sensor 299 is configured to monitor the temperature of the user (e.g., head of the user) and/or the environment around the head of the user. The temperature information is fed back to the heat controller 150, in one implementation, or through the VR content engine 120 in another implementation, for example. In that manner, one or more heating components 210 may be activated to provide a predetermined ambient temperature to the user, or to set a predetermined ambient temperature about the head of the user.

Figure 2B:
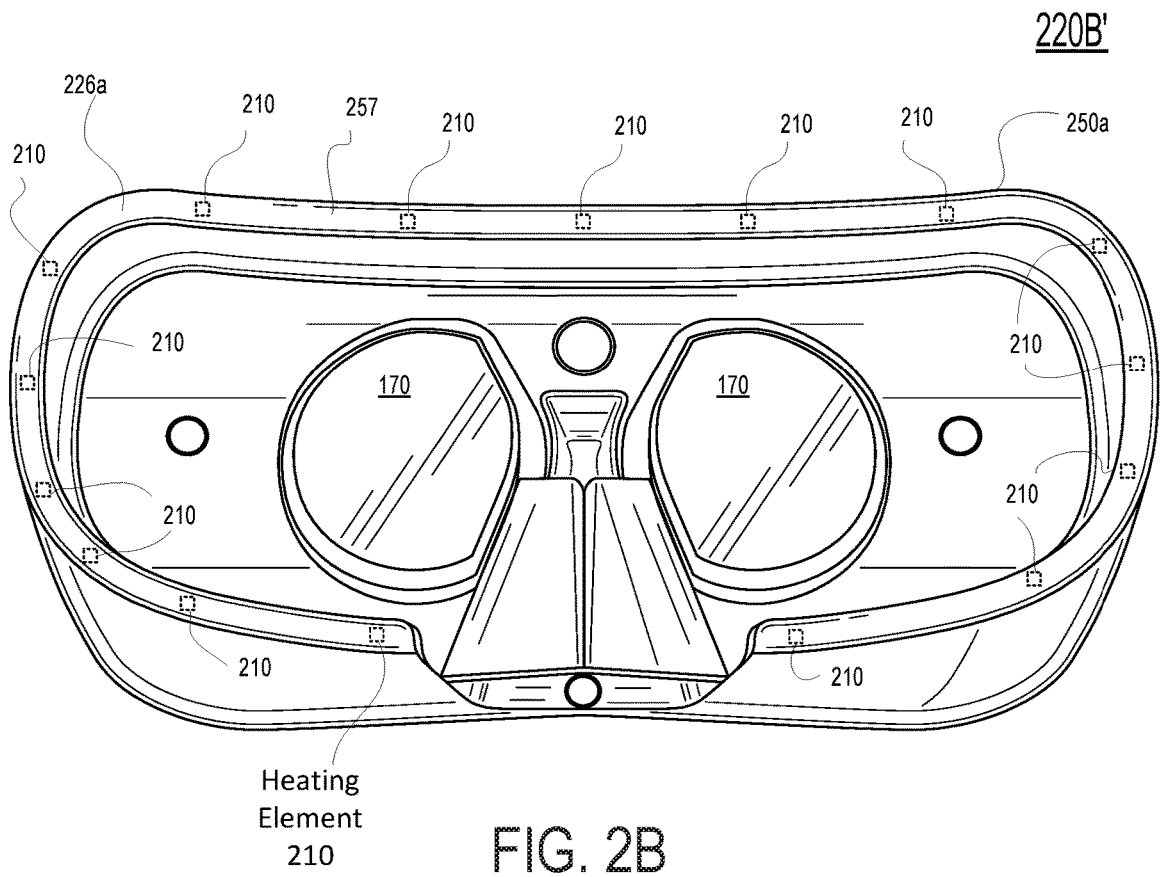
FIG. 2B illustrates a perspective view of an HMD showing a back-side view of a display housing of the HMD including a plurality of heating elements configured to provide a heat image in response to an environmental cue in VR content displayed in the HMD, in accordance with one embodiment of the present disclosure.

FIG. 2B illustrates a perspective view of an HMD 102 showing a back-side view of a display housing 220B' of the HMD 102 including a one or more heating components 210 disposed adjacent to and/or within the facial interface 250a of the display housing 220B'. Each of the heating components 210 is configured to provide a heat image in response to an environmental cue in VR content displayed in the HMD 102, in accordance with one embodiment of the present disclosure. In particular, the display housing 220B' includes the facial interface 250a that is configured to provide an interface between the display housing 220B' and the front face of a user. For example, facial interface 250' may be proximate to (e.g., slightly offset from), rest upon, or touch the front face and be configured to block most or all outside light from entering into the inner region of the display housing 220B' that is visible to the user.

The facial interface 250' includes a one or more heating components 210, each of which is individually controllable to provide heat in response to an environmental cue in VR content displayed in the HMD 102. The heat image may be associated with a particular moment in time of the VR content that is displayed. The combination of one or more heating components 210 provide a heat image, or part of an overall heat image, to the face of the user, wherein the heat image provided by the heating components of the facial interface 250a may be combined with other heating components of the support structure 220 of the HMD 102 to provide an overall heat image.

As shown, the one or more heating components 210 are located at various points of the facial interface 250a to provide heat to the front of the face in various heat image combinations. In addition, other heating components 210 may be provided within the sidewalls of the display housing 220B', such that heat may be provided to all areas of the front and sides of the face of the user in various combinations. Because the heating components 210 are individually controllable, heat may be provided to the right side of the face, to the left side, to the forehead region, top region, bottom region, or to selected portions of the face by activating one or more corresponding heating components in response to the environmental cue. As previously described, one or more heat images, or heat sub-images, may be provided by the heating components 210 of display housing 220B' over a period of time. As such, the heat produced may be modulated by strength (e.g., by changing the number of active heating components 210 throughout or in a particular area, by changing the amount of heat produced by one or more heating components 210 within the zone, etc.), or over time (e.g., changing patterns of active and inactive heating components 210 over sequential periods of time).

Further, the one or more heating components 210 may be located within the facial interface 250' of the display housing 220B' to minimize direct heat exposure to the face, as described in FIG. 2D. In addition, a liner (e.g., liner 320 of FIG. 2D) may be configured adjacent to the front face 257 of the facial interface 250' to diffuse the heat generated by the heating components 210 configured adjacent to the back face of the facial interface 250', thereby protecting the user from direct or over exposure to heat.

Figure 2C:
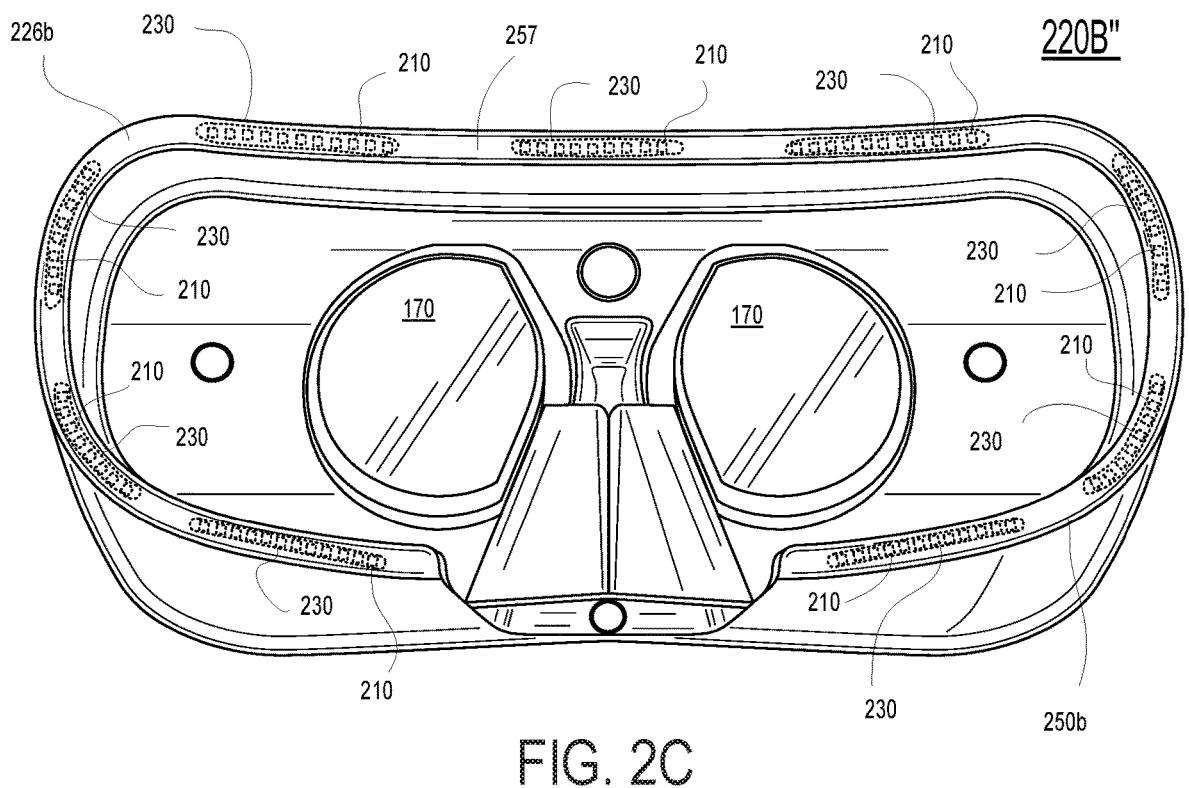
FIG. 2C illustrates a perspective view of an HMD showing a back-side view of a display housing of the HMD including a plurality of heating zones, each of which includes one or more heating elements, wherein the zones are configured to provide a heat image in response to an environmental cue in VR content displayed in the HMD, in accordance with one embodiment of the present disclosure.

FIG. 2C illustrates a perspective view of an HMD 102 showing a back-side view of a display housing 220B"

including one or more heating zones 230, wherein the zones are configured to provide a heat image in response to an environmental cue in VR content displayed in the HMD, in accordance with one embodiment of the present disclosure. The display housing 220B" includes an inner surface 226b that is exposed, wherein the inner surface 226b defines a perimeter. The display housing 220B" includes a facial interface 250b that is configured to provide an interface between the display housing 220B" and the front face of a user. For example, the front side 257 of the facial interface 250" may be proximate to (e.g., slightly offset from), rest upon, or touch the front face and be configured to block most or all outside light from entering into the inner region of the display housing 220B" that is visible to the user.

In particular, each of the heating zones 230 includes one or more heating components 210, each of which may be individually controllable to provide heat in response to the environmental cue. In another embodiment, the heating components 210 of a particular zone are controlled in unison. The heat produced within a single zone 230 may be modulated by strength (e.g., by changing the number of active heating components 210 within a particular zone 230, by changing the amount of heat produced by one or more heating components 210 within the zone, etc.), or over time (e.g., changing patterns of active and inactive heating components 210 of a particular zone over sequential periods of time). Further, the heat produced across multiple zones 230 may similarly be modulated by strength and/or time (e.g., changing the amount of heat produced by the heating components in one or more zones, changing patterns of active and inactive zones, etc.) over one or more sequential periods of time.

Figure 2E:
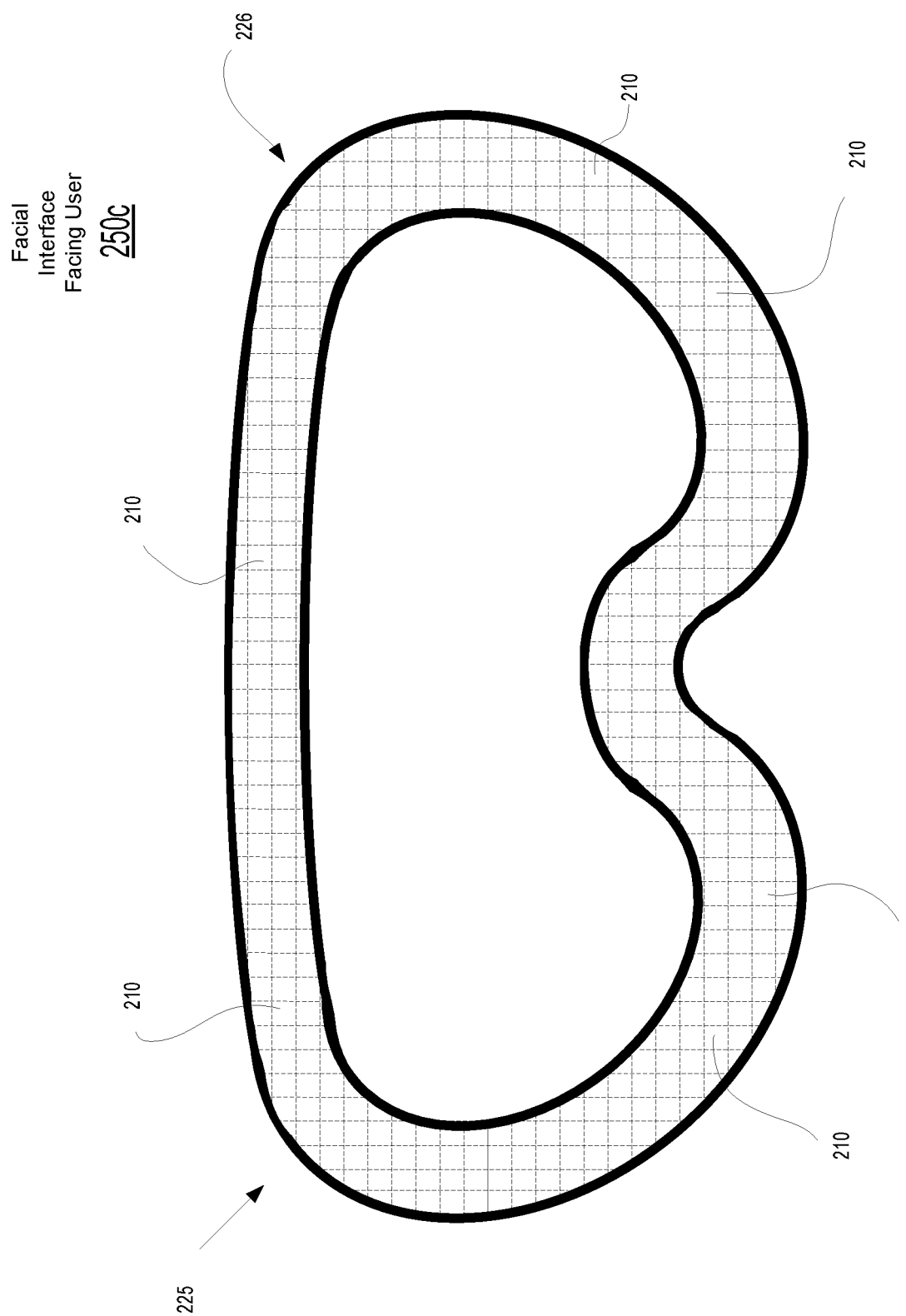
FIG. 2E illustrates a view of facial interface of a display housing of an HMD, wherein an array of heating elements is disposed in the facial skirt and configured to provide a heat image in response to an environmental cue in VR content displayed in the HMD, in accordance with one embodiment of the present disclosure.

FIG. 2E illustrates a view of a facial interface 250c of an HMD 102, wherein an array of heating components 225 is disposed in the facial interface 250c, in accordance with one embodiment of the present disclosure. The facial interface 250c may be located within a corresponding display housing (not shown) of the HMD 102, as previously described in relation to FIGS. 2A-2D. The facial interface 250c may form an inner surface 226 of a corresponding display housing 220B, such that the inner surface 226 is exposed to the face of a user.

The array 225 includes one or more heating components 210, each individually controllable and/or addressable (e.g., for active and inactive states) to provide heat in response to an environmental cue in VR content displayed in the HMD 102. In that manner, a heat image may be produced within the facial interface 250c to provide a heat image, or a heat sub-image that is part of an overall image generated within the support structure of the HMD 102, wherein the heat is directed to the face of the user. The heat image or heat sub-image is generated in response to an environmental cue in the VR content displayed in the HMD 102. The array of heating elements 225 is analogous to an array of light emitting diodes (LEDs) of light pixels of a visual display; however, instead of producing a light image, the array of heating components 225 includes heat pixels that in combination produce a heat image or heat sub-image. Further, the array of heating components 225 is configurable to produce one or more heat images or sub-images over a period of time in response to one or more environmental cues, and/or the interaction of the user within the VR environment associated with the VR content.

Figure 3A:
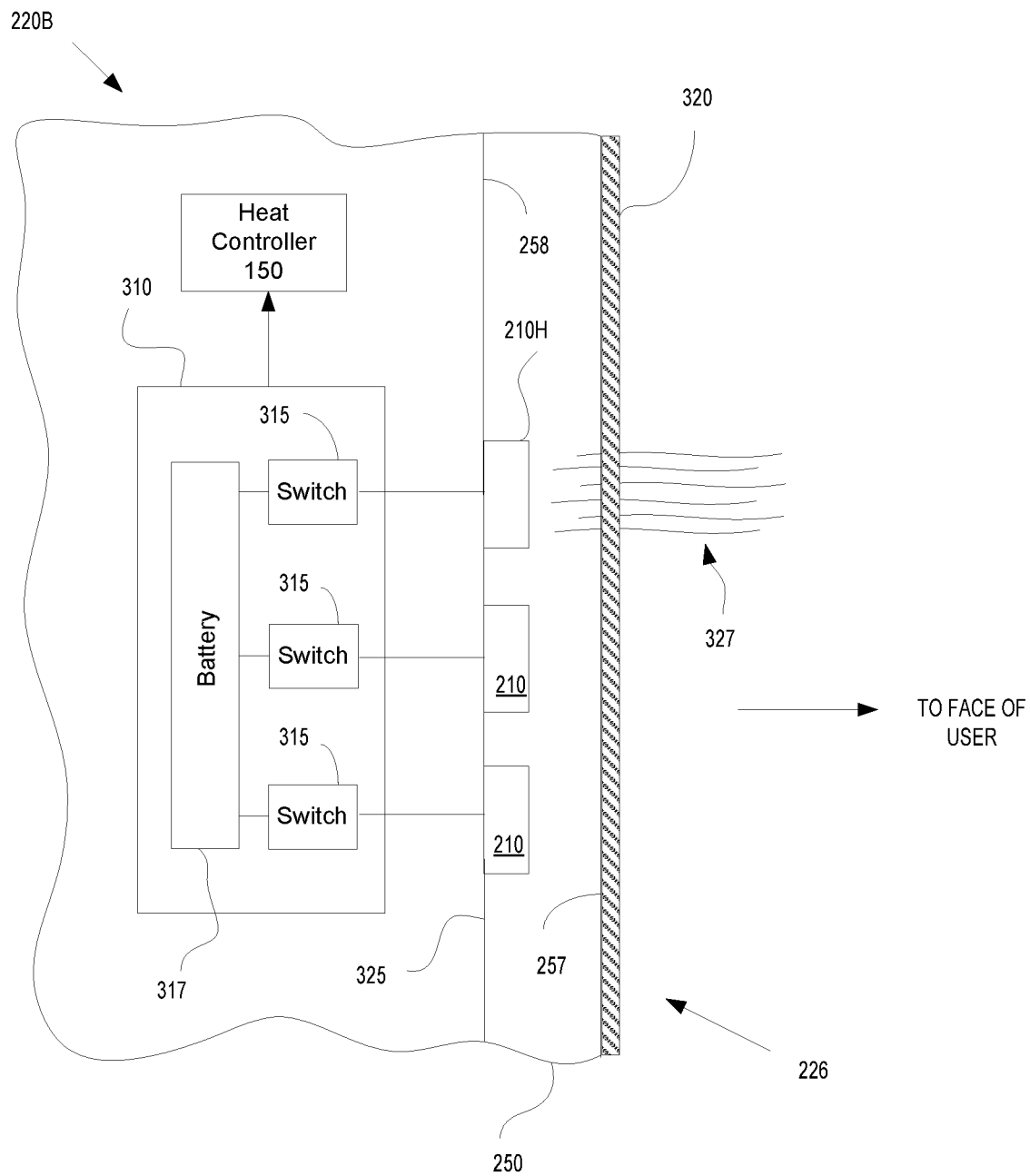
FIG. 3A is a diagram of a heating assembly including one or more heating elements, wherein a selectable one of the heating elements is shown providing heat, in accordance with one embodiment of the present disclosure.

FIG. 3A is a diagram of a portion of a display housing 220B including one or more heating elements 210, wherein a selectable one (e.g., 210H) of the heating elements is shown providing heat, in accordance with one embodiment of the present disclosure. In particular, display housing 220B may be disposed within a support structure of an HMD 102, and configured to provide heat to the face of a user. For instance, the heating components 210 may be disposed within a facial interface 250 of a display housing 220B. As shown, facial interface 250 includes a front side 257 that may form the inner surface 226 of the display housing 220B, in which case the front side 257 is exposed to the face of the user.

Optionally, a protective liner 320 may be disposed adjacent to the front side 257 of the facial interface 250. In this case, the liner 320 forms the inner surface 226 of display housing 220B, which is exposed to the face of the user. The liner 320 may be configured in such a manner within the support structure of the HMD such that the liner 320 is between the one or more heating components 210 and the head and/or face of the user. In that manner, the liner 320 acts to minimize direct heat exposure to the user, and may act to diffuse the heat generated by the heating components 210, thereby protecting the user from exposure to high heat. In one embodiment, the liner may be a separate face mask that may be worn by the user prior to putting on the HMD 102.

As shown in FIG. 3A, a power source 310 provides power to the heating components 210, wherein the power source is controlled by the heat controller 150. For example, the power source 310 may be a battery 317 local to the HMD 102, in one embodiment. In another embodiment, the power source may be provided by an outside source connected to the HMD 102. In addition, the power source 310 may include one or more switches 315, each of which controls the delivery of power to a corresponding heating component 210. Though the power source 310 is shown in a battery and switch configuration, other configurations are well suited to providing power to each of the heating elements 210, such as an outside power source providing power.

As shown, each of the heating components 210 is mounted on a support layer 325, wherein the support layer 325 may also provide insulating properties. In that manner, heat from one or more heating components 210 may be projected onto the head and/or face of the user. For example, heating component 210H is active and is producing heat 327 that is directed to a region of the face of the user. As such, only a portion of the face is exposed to heat produced by heating component 210H.

Figure 3D:
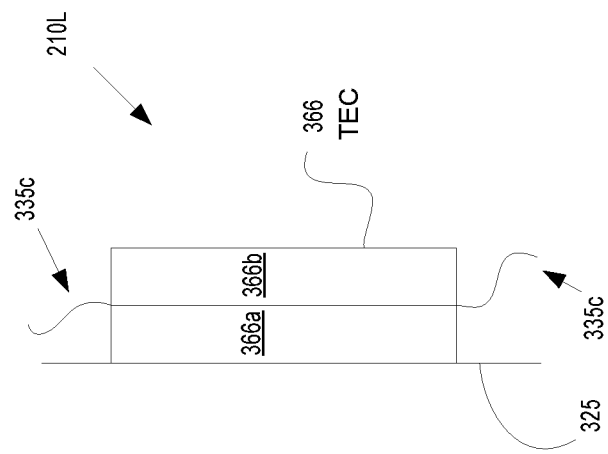
FIG. 3D is a diagram of a heating element including a thermoelectric cooling device, in accordance with one embodiment of the present disclosure.
Figure 3C:
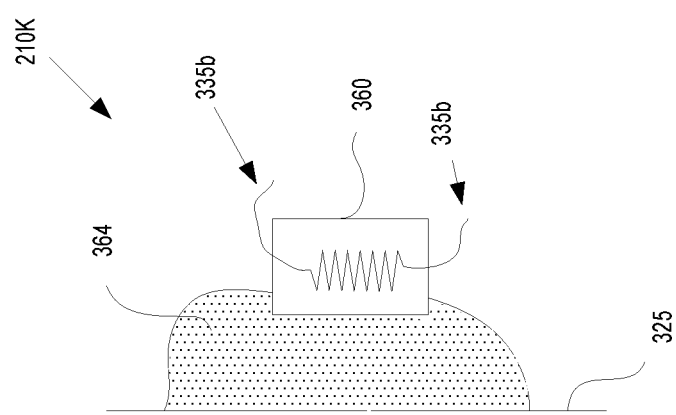
FIG. 3C is a diagram of a heating element including a thermally transmissive layer, in accordance with one embodiment of the present disclosure.
Figure 3B:
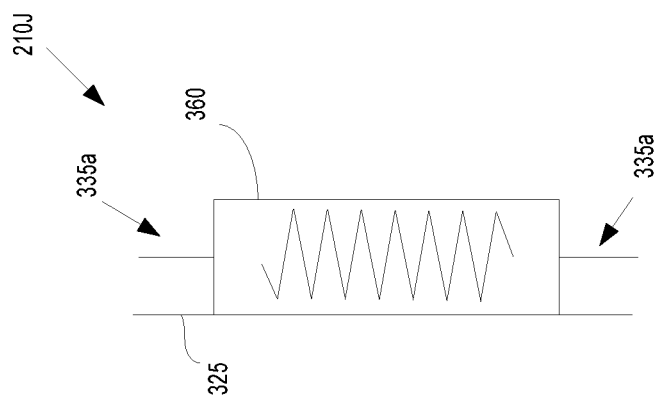
FIG. 3B is a diagram of a heating element including a resistive component, in accordance with one embodiment of the present disclosure.

FIG. 3B-3D show various implementations of a heating element 210 that is disposed within the support structure 220 of an HMD. For example, the heating element 210 may be configured within a facial interface of a display housing 220B of FIG. 3A. The various examples provided in FIGS. 3B-3D are not intended to be exhaustive of all heating components of embodiments, but are representative to the types of heating components capable of being used within support structure 220 of an HMD 102.

For example, FIG. 3B is a diagram of a heating component 210J including a resistive element 360 disposed on or within a support layer 325, in accordance with one embodiment of the present disclosure. For example, the support layer may be the back side 258 of a facial interface 250 of a display housing 220B. The resistive element 360 generates heat when power is supplied via leads 335a. In another embodiment, the heating element 210J includes a heating panel. For example, the heating panel may include one or more resistive elements 360.

In addition, FIG. 3C is a diagram of a heating element 210K including a thermally transmissive portion or layer 364, in accordance with one embodiment of the present disclosure. In particular, the heating element 210K includes a resistive element 360, for example, that is capable of generating heat when power is supplied via leads 335b. The resistive component 360 is disposed on or within the thermally transmissive portion 364. The support layer 325 supports the thermally transmissive portion 364 disposed on or within the support layer 325. For example, the support layer may be the back side 258 of a facial interface 250 of a display housing 220B. The thermally transmissive portion 364 may include a material (e.g., thermal paste) that has transmissive and/or diffusive properties. For example, the thermally transmissive portion 364 may act to deliver heat more quickly (e.g., to the face of user) than that only provided by the resistive component 360. Also, independent of, or in addition to, the transmissive properties, the thermally transmissive portion 364 may act to diffuse the heat generated by the resistive component 360 across a larger area of the face of the user, for example. Further, the thermally transmissive portion 364 may act to direct the heat in a particular direction. In that manner, given the various properties of the thermally transmissive portion 364, the heat is diffused and acts to distribute the overall heat produced by the resistive component 360 across a larger region (e.g., to reduce hot spots and burns, etc.), and to provide a smoother translation of the heat generated by the resistive component 360 to the face and/or head of the user.

FIG. 3D is a diagram of a heating element 210L including a thermoelectric cooling (TEC) device 366, in accordance with one embodiment of the present disclosure. As shown, TEC device 366 is disposed on or within the support layer 325. For example, the support layer may be the back side 258 of a facial interface 250 of a display housing 220B. In particular, the TEC device 366 acts to create a heat flux between the junction of two materials (e.g., an n/p junction). The junction separates two sides 366a and 366b of the TEC device 366. The TEC device 366 acts to transfer heat from one side of the device to the other device depending on the direction of current flow through leads 335, and thus polarity of the voltage presented across the TEC device 366. That is, under one polarity of voltage, the side 366a adjacent to the support layer 325 may generate heat, as heat is transferred to that side. Under the opposite polarity of voltage, the side 366a adjacent to the support layer 325 may generate cooling, as heat is transferred from side 366a to the other side 366b. In one embodiment, TEC device 366 is able to cool off the side 366a to a default setting using the cooling properties of the TEC device 366. In another embodiment, the TEC device 366 is able to provide both heating and cooling properties within the support structure of the HMD 102.

Figure 4A:
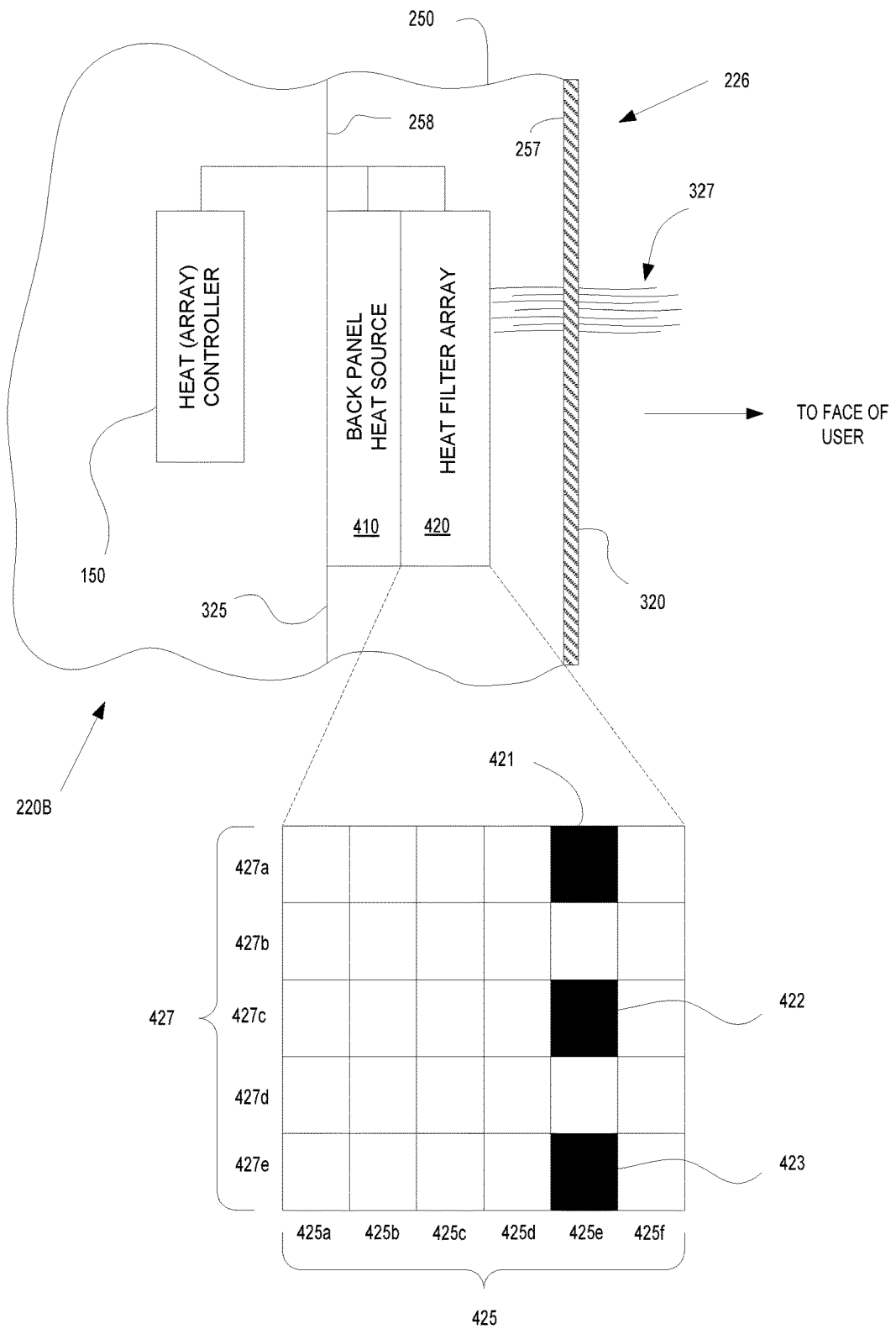
FIG. 4A is a diagram of a heating assembly of an HMD, wherein the heating assembly includes a heat filter configured to selectively pass and block heat from a heat source to generate a heat image responsive to an environmental cue in VR content displayed in the HMD, in accordance with one embodiment of the present disclosure.

FIG. 4A is a diagram of a portion of a display housing 220B of an HMD 102 configured to provide heat through a heat filter to a user, wherein a multi-layer heating device including a heat filter array 420 that is configured to selectively pass and block heat from a heat source 410 to generate a heat image responsive to an environmental cue in VR content displayed in the HMD, in accordance with one embodiment of the present disclosure, in accordance with one embodiment of the present disclosure. In particular, display housing 220B may be disposed within a support structure of an HMD 102, that when worn is configured to deliver heat to the head of the user, such as the face of the user. For instance, the heat source 410 and the heat filter array 420 that provide directional heat may be disposed within a facial interface 250 of the display housing 220B. Facial interface 250 includes a front side 257 that may form the inner surface 226 of the display housing 220B, in which case the front side 257 is exposed to the face of the user.

Optionally, a protective liner 320 may be disposed adjacent to the front side 257 of the facial interface 250. In this case, the liner 320 forms the inner surface 226 of display housing 220B, which is exposed to the face of the user. The liner 320 may be configured in such a manner within the support structure of the HMD such that the liner 320 is between the beat source 410 and heat filter array 420 configuration and the head and/or face of the user. In that manner, the liner 320 acts to minimize direct heat exposure to the user, and may act to diffuse the heat generated by the heating components 210, thereby protecting the user from exposure to high heat. In one embodiment, the liner may be a separate face mask that may be worn by the user prior to putting on the HMD 102.

As shown, the multi-layer heating device includes a first layer that may comprise a heating panel 410. For example, the heating panel 410 may be any configured as any type of heat source, such as a heat lamp, or one or more heating elements. The heating panel 410 is configurable to provide all or most of the heat to each of the heat pixels in the multi-layer heating device.

In addition, the multi-layer heating device includes a second layer that includes an array of heat filtering elements or sub-panels 420. The second layer is positioned between the face of the user and the heating panel 410 when the HMD 102 is worn. The array of filtering elements or sub-panels 420 includes a plurality of addressable rows 427 of filter elements (e.g., rows 427a-427e), and a plurality of addressable columns 425 of filter elements or sub-panels (e.g., columns 425a-425f). In that manner, an individual filter element or sub-panel is controllable through row and column addressing, such as by the heat/array controller 150'. In particular, each of the heat filtering elements or sub-panels is configured to pass or block heat from the heating panel 410. Further, each of the heat filtering elements or sub-panels in the array 420 is individually controllable to provide in combination a heat image in response to an environmental cue in the VR content displayed on the display screen of the HMD 102.

As shown, heat filter array 420 is configured to provide a heat image based on which filter elements in the array 420 is active or inactive. For example, a filter element or sub-panel in the array 420 that is colored black may pass heat from the heat back panel 410, whereas a filter element or sub-panel in the array 420 that is colored white may block heat from the heat back panel 410. In the example shown in FIG. 4A, sub-panels 421, 422, and 423 of column 425e are active, and pass heat. The other sub-panels in the heat filter array 420 are inactive and act to block heat from the heat back panel 410. In that manner, a line of heat may be provided to the forehead of the user, wherein the line extends from the hairline of the forehead down, instead of across the forehead from one side of the head to another. In addition, not all the sub-panels in column 425e are active, which acts to modulate the strength of the heat provided by the sub-panels in column 425e. For example, if there are five sub-panels in column 425e, because only three of those panels are active and passing heat, effectively, the sub-panels in column 425e are providing sixty percent of the available heat.

In another embodiment, because the heat filter elements or sub-panels in the array 420 are individually addressable, one or more heat images may be generated over a period of time. For example, the line of heat generated by the array 420 may travel in a line from one side to the other side of the head of the user. That is, at a beginning point in time, one or more sub-panels in column 425a may be active and provide heat to the head of the user. At the next point in time, one or more sub-panels in column 425*b* may be active. This is repeated until all the columns are similarly treated. As such, the user is given a sense that heat is passing from one side of the forehead to the other side.

Figure 4B:
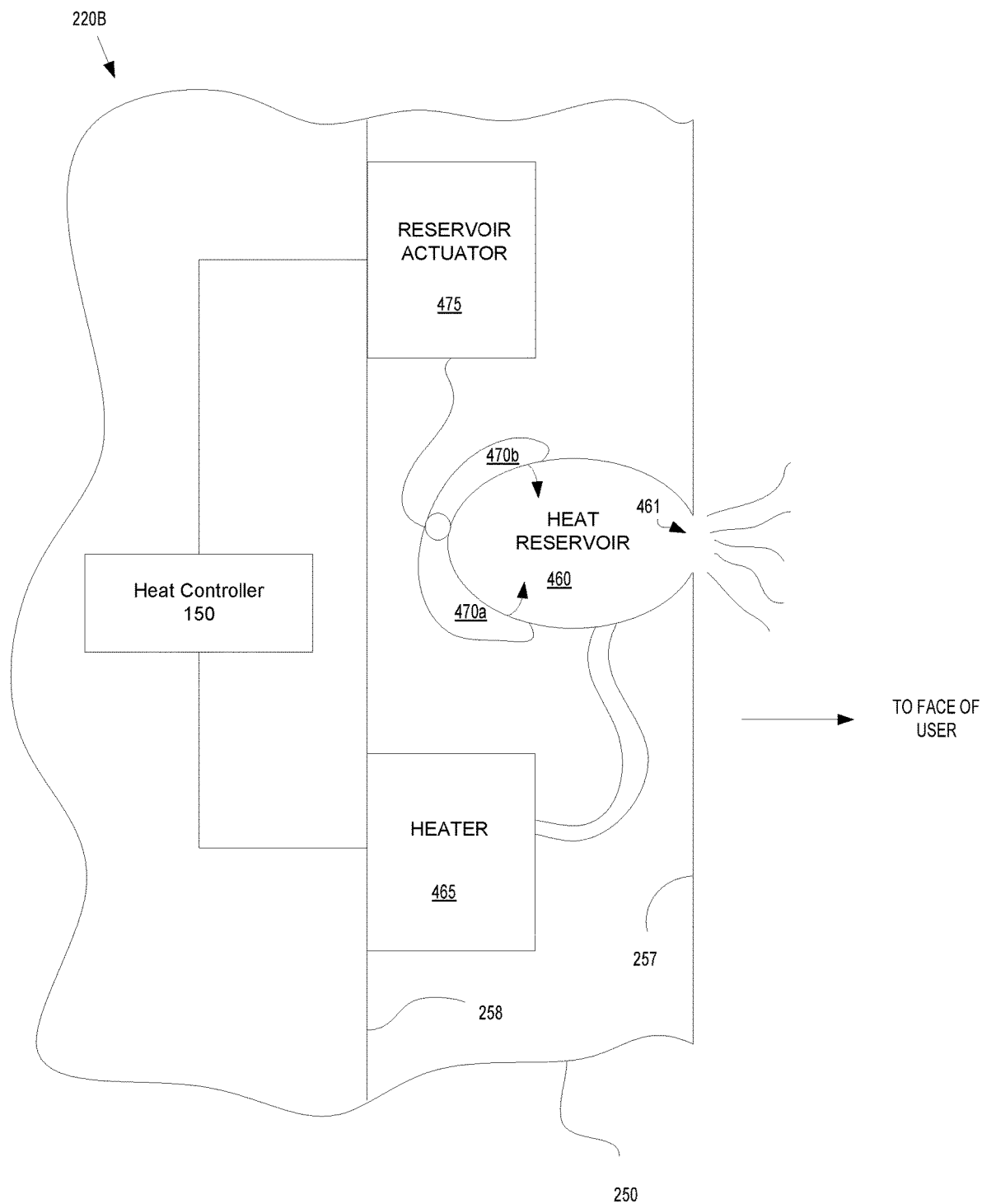
FIG. 4B is a diagram of a heating assembly of an HMD, wherein the heating assembly include a heat reservoir configured to store heat and expel the stored heat to the user in response to an environmental cue in VR content displayed in the HMD, in accordance with one embodiment of the present disclosure.

FIG. 4B is a diagram of a portion of a display housing 220B of an HMD 102, including a heat that is configured to store heat and expel the stored heat to the user in response to an environmental cue in VR content displayed in the HMD 102, in accordance with one embodiment of the present disclosure. In particular, display housing 220B may be disposed within a support structure of an HMD 102, that when worn is configured to deliver heat to the head of the user, such as the face of the user. For instance, some components may be disposed within the facial interface 250 of the display housing 220B. Facial interface 250 includes a front side 257 that may form the inner surface 226 of the display housing 220B, in which case the front side 257 is exposed to the face of the user. As shown in FIG. 4B, the heat reservoir 461 and reservoir actuator 475 and heater 465 that provide directional heat may be disposed within a facial interface 250 of the display housing 220B. The hater 465 and reservoir actuator 475 are adjacent to the back side 258 of the facial interface 250.

As shown in FIG. 4B, the heat reservoir 460 configured to store heat is pliable. For example, the heat reservoir 460 may define an enclosure that traps air, wherein the air can be heated by heater 465 to a predefined temperature. In one embodiment, the heater 465 is constantly heating the air in the heat reservoir 460, as controlled by the heat controller 150. In another embodiment, the heater 465 provides intermittent heating to heat reservoir 460 depending on the need, as controlled by heat controller 150. For example, the heat reservoir 460 may be preheated in response to a heat image that will be generated for an environmental cue in VR content that will be displayed in the near future in the HMD 102. This has the added benefit of saving power. Though only one heat reservoir 460 is shown, display hosing 220B may include one or more heat reservoirs and its supporting components (e.g., actuator 475 and heater 465).

At the appropriate time, the heat in the heat reservoir 460 is expelled through opening 461 in response to an environmental cue in VR content displayed in HMD 102. For example, reservoir actuator 475 is engaged to actuate the arms 470*a* and 470*b* in a squeezing motion to squeeze reservoir 460 and expel the heated air contained within the reservoir 460, as controlled by the heat controller 150.

Figure 5A:
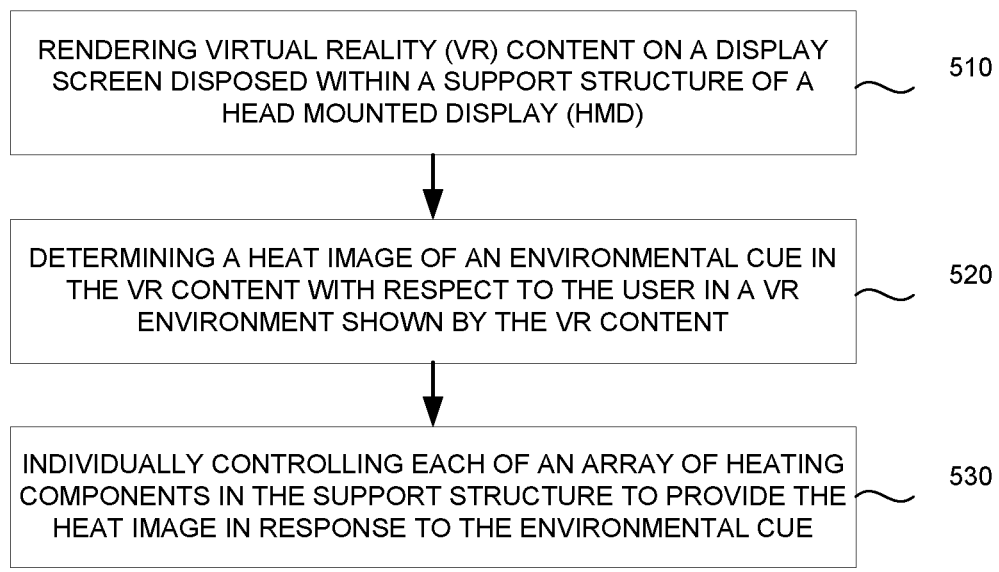
FIG. 5A is a flow diagram illustrating a method for providing VR stimulation, in accordance with one embodiment of the present disclosure.

With the detailed description of the various modules of the HMD configured to provide heat in response to an environmental cue in VR content presented in the HMD, a method for VR stimulation is now described in relation to flow diagram 500A of FIG. 5A, in accordance with one embodiment of the present disclosure. The method outlined in flow diagram 500A is implemented by one or more systems and/or components of FIGS. 1A-1B, 2A-2E, 3A-3D, and 4A-4B in embodiments.

The method begins at operation 510, and includes rendering VR content on a display screen of an HMD. In particular, the display screen is disposed within a support structure of the HMD, wherein the support structure and/or HMD are configured to fit around of a head of a user when worn. The display screen is located in front of an eye of the user when the HMD is worn. In that manner, interactive VR content is viewable to the user when the HMD is worn.

Figure 6:
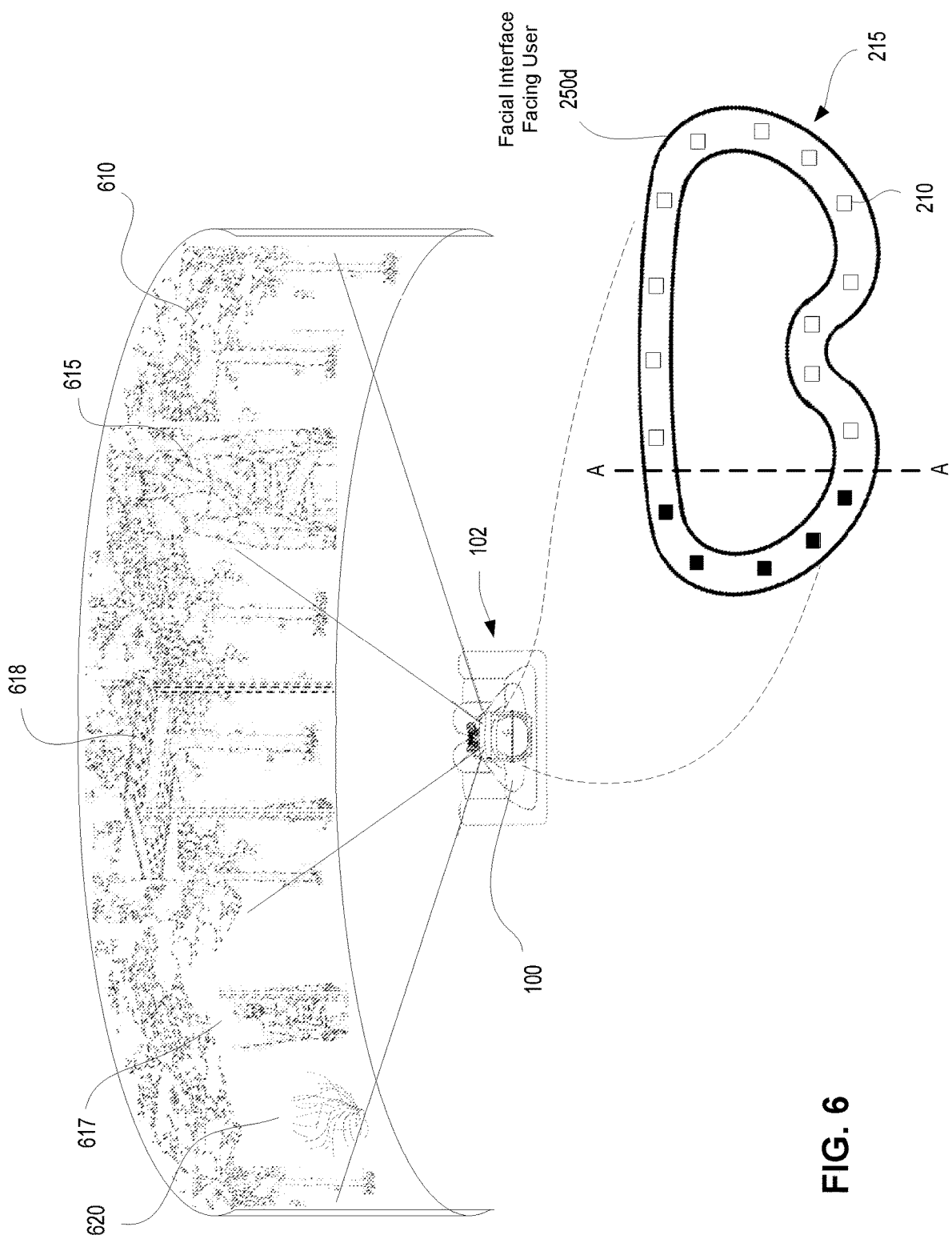
FIG. 6 is an illustration of an immersive experience of a user interacting with VR content displayed in an HMD, wherein the HMD is configured for providing a heat image in response to an environmental cue in the VR content, in accordance with one embodiment of the present disclosure.

The method includes at operation 520, determining a heat image of an environmental cue in the VR content with respect to an interaction of the user within a VR environment shown by the VR content. The HMD is configured for providing the heat image in response to an environmental cue in the VR content. That is, the VR content may include one or more environmental cues, each of which may provide heat as a heat source. For example, a bomb blast in the VR environment would be associated with heat emanating from the source of the bomb blast in the VR environment as shown by the VR content. FIG. 6 is an illustration of an immersive experience of a user interacting with the VR content displayed in an HMD 102, in accordance with one embodiment of the present disclosure. In particular, VR content 610 is shown at a particular moment in time during an interaction with the VR content by user 100, wherein HMD 102 is displaying the VR content. The VR environment created by the VR content includes a scene of a jungle camp. Three warriors are visible and/or inferred to be in the VR environment, including the user 100 (or avatar associated with user 100), the soldier 617, and soldier 615. As shown in the display of HMD 102, the user is closer to soldier 615 in the VR environment than to solider 617, who is sitting by the fire 620, which is a source of heat. The user may be directly speaking with soldier 615 at this moment in time in the VR environment. In addition, soldier 617 is to the left of the user, and soldier 615 is to the right of the user. Because the fire 620 is large, the user 100 interacting with the VR environment of the VR content should be able to feel heat from the fire 620. Embodiments of the present invention provide that interaction and/or stimulation.

The heat image is determined with respect to the user in the VR environment of the VR content, wherein the heat image is generated for one or more heating elements disposed in the HMD 102. That is, the heat image is based in part on the interactions of the user within the VR environment. These interactions may include locations of heat source and the user, the strength of the heat source, the orientation of the user with respect to the heat source, etc.

At 530, the method includes individually controlling each of an array of heating components in the HMD 102 to provide the heat image in response to the environmental cue in the VR content displayed on the display screen of the HMD 102. The one or more heating components may be configured as an array of heating components, wherein each of the heating components is individually controllable to provide heat. Further, the array of heating components may be disposed in the support structure of the HMD 102, as previously described. For example, the support structure may include a lens of optics configured for viewing the VR content, and a display screen disposed behind the lens of optics such that the lens of optics is between the display screen and the eye of a user when the HMD is worn by the user, wherein the display screen is configured for rendering the VR content. The support structure is configured to fit around the head of the user when worn, wherein the lens of optics and display screen are disposed within the support structure such that the display screen is located in front of the eye when the HMD is worn. In addition, the array of heating components is disposed in the support structure, wherein each component in the array of heating components is individually controllable to provide a heat image in response to the environmental cue in the VR content displayed on the display screen.

Figure 5B:
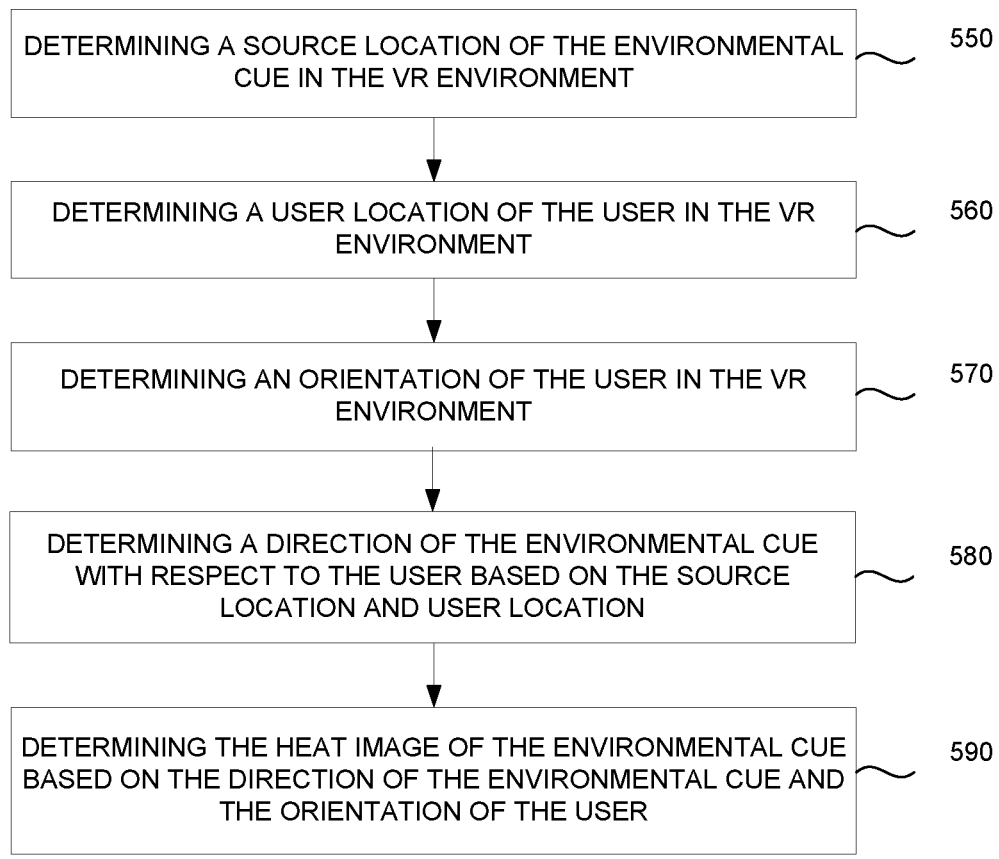
FIG. 5B is a flow diagram illustrating a method for generating a heat image responsive to an environmental cue in VR content as experienced by a user wearing an HMD showing the VR content, in accordance with one embodiment of the present disclosure.

FIG. 5B is a flow diagram 500B illustrating a method for generating a heat image responsive to an environmental cue in VR content as experienced by a user wearing an HMD showing the VR content, in accordance with one embodiment of the present disclosure. The method outlined in flow diagram 500B provides additional detail to operation 520 of flow diagram 500A in FIG. 5A.

Various factors can be considered when determining a heat image. For example, the orientation of the user with respect to the environmental cue is an important factor to consider when determining the heat image. For example, orientation includes determining in which direction is the head of the user orientated with respect to the source of the environmental cue. In addition, the relative distance between the user and the source of the environmental cue is an important factor to consider when determining the heat image. Also, the strength of the heat source is an important factor. Still other factors can be considered when determining the heat image. As such, flow diagram provides a method for determining the heat image, when considering one or more factors.

In particular, at operation 550, the method includes determining a source location of the environmental cue in the VR environment. For example, as shown in FIG. 6, the source location of the fire 620 in the VR environment is determined. At 560, the method includes determining a user location of the user in the VR environment. In that manner, the location of the user is known relative to the location of the location of the source location of the environmental cue.

In addition, at 570, the method includes determining an orientation of the user in the VR environment, and at 580, the method includes determining a direction of the environmental cue with respect to the user based on the source location and user location. That is, with respect to the user, a direction of the environmental cue can be determined. For example, in FIG. 6, the relative direction of the environmental cue (e.g., fire 620) is generally to the left of the user 100 within the VR environment. In another embodiment, the method includes determining a strength of the heat image based on the distance between the source location the user location in the VR environment, and based on the volume of heat associated with the environmental cue.

At operation 590, the method includes determining the heat image of the environmental cue based on the direction of the environmental cue and the orientation of the user, previously determined. The orientation and direction information will define how the heat image is portrayed and/or generated within the heating assembly of the HMD 102. For example, given the user's orientation within the VR environment (i.e., facing towards the gazebo 618) the fire 620 is to the left side of user 100 in the example provided by FIG. 6. As such, any heat image as generated by the heating assembly would be presented to the left side of the face of user 100. In particular, the facial interface 250"" of the display housing of the HMD 102 includes a plurality of heating components 215 in the heating assembly. The facial interface 250"" as shown in FIG. 6 is facing the user 100 when the HMD 102 is worn. In the heat image, only heating components to the left side of line A-A are active and providing heat. In that manner, the heat image provides the sensation of heat to the left side of the face of user 100. A relative strength as projected by the heat image may be provided based on the distance between the user and the environmental cue and the strength of the heat source.

Figure 7:
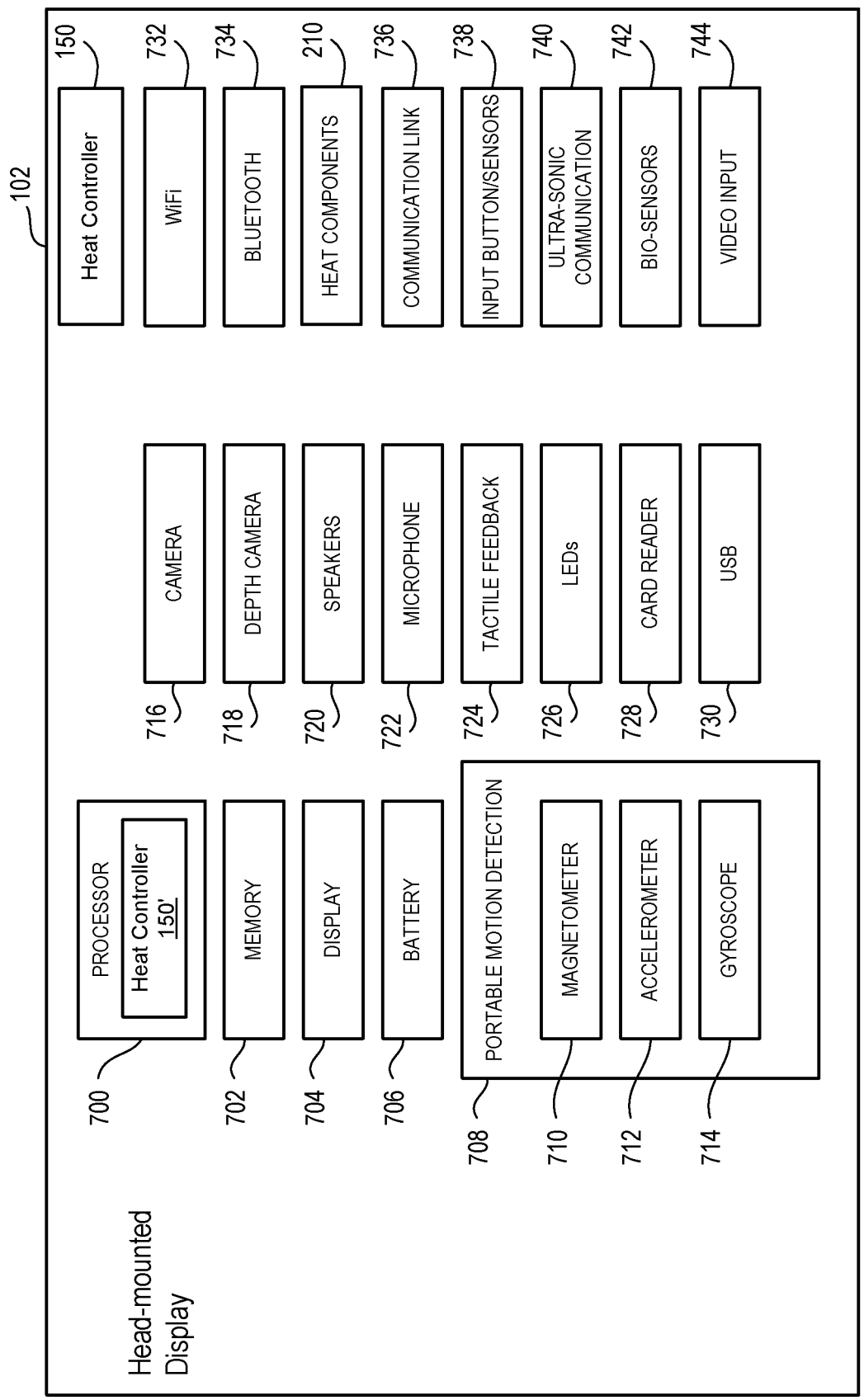
FIG. 7 illustrates components of a head-mounted display, in accordance with one embodiment of the present disclosure.

FIG. 7, a diagram illustrating components of a head-mounted display (HMD) 102 is shown, in accordance with an embodiment of the disclosure. The HMD may be configured to provide heat in response to an environmental cue in VR content displayed in the HMD.

The head-mounted display 102 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 102. A motion detection module 708 may include any of various kinds of motion sensitive hardware, such as a magnetometer 710, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710 to obtain the inclination and azimuth of the head-mounted display 102.

A gyroscope is a device for measuring or maintaining orientation, based on the principles of angular momentum. In one embodiment, three gyroscopes 714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 718 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 720 for providing audio output. Also, a microphone 722 may be included for capturing audio from the real environment, including sounds from the ambient environment, speech made by the user, etc. The head-mounted display 102 includes tactile feedback module 724 for providing tactile feedback to the user. In one embodiment, the tactile feedback module 724 is capable of causing movement and/or vibration of the head-mounted display 102 so as to provide tactile feedback to the user.

LEDs 726 are provided as visual indicators of statuses of the head-mounted display 102. For example, an LED may indicate battery level, power on, etc. A card reader 728 is provided to enable the head-mounted display 102 to read and write information to and from a memory card. A USB interface 730 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 732 is included for enabling connection to the Internet via wireless networking technologies. Also, the head-mounted display 102 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 102 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

In addition, heat assembly 290 is included to provide heat within the HMD 102 that is generated in response to an environmental cue in the VR content displayed by the HMD 102.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 8:
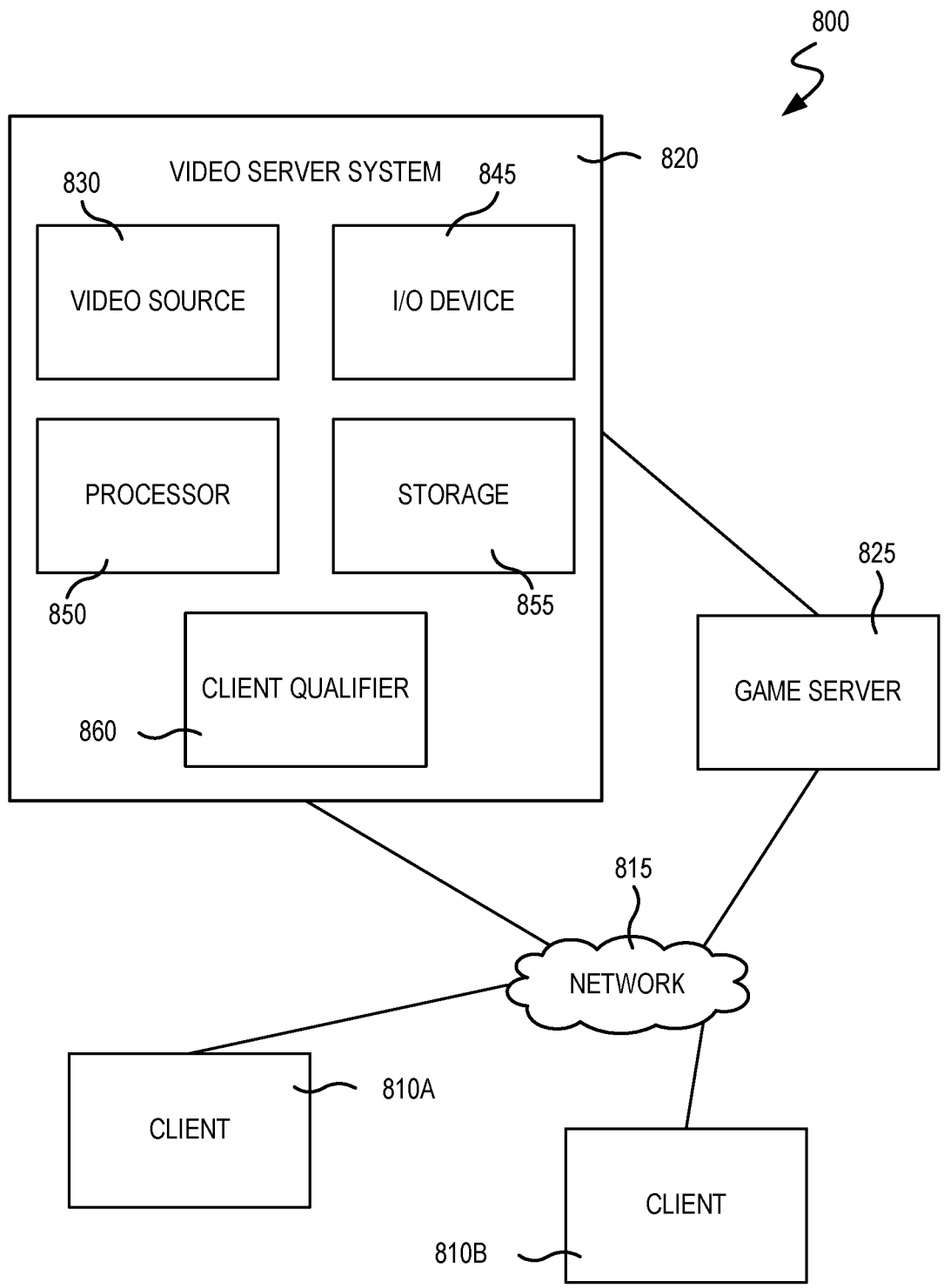
FIG. 8 is a diagram of a Game System, in accordance with one embodiment of the present disclosure.

FIG. 8 is a block diagram of a Game System 800, according to various embodiments of the disclosure. Game system 800 may be used to provide VR content. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the disclosure.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect gameplay. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multiplayer game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g. a hard drive, an optical drive, or solid state storage. Storage 815 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc. of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

While specific embodiments have been provided for providing heat in a HMD that is in response to an environmental cue in VR content displayed in the HMD, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A head mounted display (HMD), comprising:
   optics configured for viewing virtual reality (VR) content;
   a display screen disposed behind the optics such that the optics is between the display screen and an eye of a user when the HMD is worn by the user, wherein the display screen and optics are part of a display housing, and the display screen is configured for rendering the VR content;
   a support structure configured to fit around a head of the user and connect to the display housing when worn, wherein the display housing places the display screen in front of the eye when the HMD is worn; and
   a heating component being part of the display housing, the heating component being disposed in a perimeter region around the optics and opposite the display screen, wherein the heating component is controllable to generate heat in response to an environmental cue in the VR content displayed on the display screen,
   wherein the environmental cue provides a visualization of heat in a VR environment, the VR content providing a view into the VR environment.

2. The head mounted display of claim 1,
   wherein the support structure includes a head attachment configured for support on the head when the HMD is worn; and
   wherein the display housing is attached to the head attachment and configured to rest proximate to a face of the user so that the display screen is positioned in front of the face of the user when the HMD is worn;
   wherein the heating component is interfaced with the display housing such that heat from the heating component is exposed in a direction towards the face.

3. The head mounted display of claim 2, wherein the display housing comprises:
   a facial interface in the perimeter region and surrounding an inside surface of the display housing, the facial interface including a front side facing the user and a back side, wherein the heating component is configured adjacent to the back side of the facial interface.

4. The head mounted display of claim 1, further comprising:
   a second heating component being part of the display housing and disposed in the perimeter region, wherein the second heating component is individually controllable to generate heat in response to the environmental cue.

5. The head mounted display of claim 4, wherein the heating component and the second heating component are controllable to provide heat over a period of time in response to the environmental cue.

6. The head mounted display of claim 1, wherein the heating component comprises:
   a resistive element.

7. The head mounted display of claim 1, wherein the heating component comprises:
   a heating panel.

8. The head mounted display of claim 7, wherein the heating component further comprises a multilayer heating component comprising:
   a first layer including the heating panel; and a second layer including an array of heat filtering elements, wherein the second layer is positioned between a face of the user and the first layer when the HMD is worn, wherein each of the heat filtering elements is configured to pass or block heat from the heating panel, wherein each of the heat filtering elements is individually controllable within the array of heat filtering elements to provide a heat image in response to the environmental cue in the VR content displayed on the display screen.

9. The head mounted display of claim 1, wherein the heating component comprises:
a thermoelectric cooling (TEC) device.

10. The head mounted display of claim 1, wherein the heating component comprises:
a heating element; and
a thermally transmissive layer mounted on a first layer, wherein the heating element is disposed on the thermally transmissive layer, such that heat from the heating element is diffused through the thermally transmissive layer before being exposed to the face.

11. A head mounted display (HMD), comprising:
optics configured for viewing virtual reality (VR) content;
a display screen disposed behind the optics such that the optics is between the display screen and an eye of a user when the HMD is worn by the user, wherein the display screen and optics are part of a display housing, and the display screen is configured for rendering the VR content, wherein the display housing is configured to rest proximate to a face of the user so that the display screen is positioned in front of the face of the user when the HMD is worn;
a facial interface in a perimeter region and surrounding an inside surface of the display housing, the facial interface including a front side facing the user and a back side; and
an array of heating components being a part of the display housing adjacent to the back side of the facial interface, the array of heating components being disposed around the perimeter region around the optics and opposite the display screen, wherein each heating component of the array of heating components is individually controllable to generate heat to provide a heat image in response to an environmental cue in the VR content displayed on the display screen,
wherein the environmental cue provides a visualization of heat in a VR environment, the VR content providing a view into the VR environment.

12. The head mounted display of claim 11, wherein the support structure further comprises:
a head attachment configured for support on a head of the user when the HMD is worn, wherein the display housing is attached to the head attachment, and wherein heat from the array of heating components is exposed in a direction towards the face.

13. The head mounted display of claim 12, wherein the array of heating components is part of the head attachment and display housing.

14. The head mounted display of claim 11, wherein the array of heating components is controllable to provide a plurality of heat images over a period of time in response to changes in the environmental cue.

15. The head mounted display of claim 11, wherein each heating component of the array of heating components comprises:
a resistive element.

16. The head mounted display of claim 11, wherein each heating component of the array of heating components comprises:
a heating element; and
a thermally transmissive layer mounted on a first layer, wherein the heating element is disposed on the thermally transmissive layer, such that heat from the heating element is diffused through the thermally transmissive layer before being exposed to the face.

17. The head mounted display of claim 11, wherein heating components in the array of heating components are distributed evenly.

18. The head mounted display of claim 11, wherein heating components in the array of heating components are distributed unevenly.

19. The head mounted display of claim 11, wherein the array of heating components is configurable to provide heat to at least one of the following regions of the user including:
a front of the face or
a left side of the face or
a right side of the face or
a bottom of the face or
a top of the face.

20. A method for virtual reality simulation, comprising:
rendering virtual reality (VR) content on a display screen behind optics, wherein the display screen and optics are part of a display housing, wherein a support structure of a head mounted display (HMD) is configured to fit around of a head of a user and connect to the display housing when worn, wherein the display screen is located in front of an eye of the user when the HMD is worn;
determining a heat image of an environmental cue in the VR content with respect to an interaction of the user with a VR environment shown by the VR content, the environmental cue providing a visualization of heat in the VR environment; and
individually controlling each heating component of an array of heating components to provide the heat image in response to the environmental cue in the VR content displayed on the display screen,
wherein each heating component in the array of heating components is configured to generate heat,
wherein the array of heating components being part of the display housing, the array of heating components being disposed in a perimeter region around the optics and in front of the display screen towards the eye of the user when the HMD is worn.

21. The method of claim 20, further comprising:
controlling the array of heating elements to provide a plurality of heat images over a period of time in response to changes in the environmental cue.

22. The method of claim 20, wherein the individually controlling each heating component of an array of heating components includes:
determining a source location of the environmental cue in the VR environment;
determining a user location of the user in the VR environment;
determining an orientation of the user in the VR environment;
determining a direction of the environmental cue with respect to the user based on the source location and the user location;
determining the heat image of the environmental cue based on the direction of the environmental cue and the orientation of the user.

23. The method of claim 22, further comprising:
determining a strength of the heat image based on a distance between the source location and the user location in the VR environment, and based on a volume of heat associated with the environmental cue.

24. The method of claim 20, wherein the HMD includes:
the display screen disposed behind the optics such that the optics is between the display screen and the eye of the user when the HMD is worn by the user.

25. The head mounted display of claim 9, wherein the thermoelectric cooling device is configured to provide cooling in response to another environmental cue in the VR content displayed on the display screen.

26. A head mounted display (HMD), comprising:
optics configured for viewing virtual reality (VR) content;
a display screen disposed behind the optics such that the optics is between the display screen and an eye of a user when the HMD is worn by the user, wherein the display screen is configured for rendering the VR content;
a display housing configured to include the optics and the display screen, wherein the display housing is configured to rest proximate to a face of the user so that the display screen is positioned in front of the face of the user when the HMD is worn;
a facial interface in a perimeter region and surrounding an inside surface of the display housing; and
an array of temperature controllable components being part of the facial interface, the array of temperature controllable components being disposed around the perimeter region in front of the optics and opposite the display screen, wherein each temperature controllable component of the array of temperature controllable components is individually controllable to generate heat in response to an environmental cue in the VR content displayed on the display screen,
wherein the environmental cue provides a visualization of heat in a VR environment, the VR content providing a view into the VR environment.

27. The HMD of claim 26, wherein a first temperature controllable component is configured to provide heating or cooling.

28. A head mounted display (HMD), comprising:
a facial interface surrounding eyes of a user and configured to be proximate to a face of the user when the HMD is worn, the facial interface having one or more heat generating components that are activated during at least part of a virtual reality (VR) session,
wherein the activation of the one or more heat generating components is tied to a heat generating environmental cue in a VR environment of the VR session,
wherein the environmental cue provides a visualization of heat in a VR environment, the VR session providing one or more views into the VR environment.

29. The HMD of claim 28,
wherein generation of heat in the facial interface is controlled from one side of the face of the user to an opposing side of the face when the HMD is worn depending on a location of a heat source associated with the heat generating environmental cue in the VR environment in relation to a location of the user and movement of the face of the user in the VR environment.

* * * * *